United States Patent
Koseoglu

(10) Patent No.: US 10,961,470 B1
(45) Date of Patent: Mar. 30, 2021

(54) THERMAL HYDRODEALKYLATION OF HYDROCRACKING FEEDSTOCK TO MITIGATE HPNA FORMATION

(71) Applicant: Saudi Arabian Oil Company, Dhahran (SA)

(72) Inventor: Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/856,152

(22) Filed: Apr. 23, 2020

(51) Int. Cl.
| | |
|---|---|
| *C10G 65/10* | (2006.01) |
| *B01J 19/00* | (2006.01) |
| *C10G 67/02* | (2006.01) |
| *B01J 19/24* | (2006.01) |

(52) U.S. Cl.
CPC .......... *C10G 65/10* (2013.01); *B01J 19/0013* (2013.01); *B01J 19/245* (2013.01); *C10G 67/02* (2013.01); *B01J 2219/0004* (2013.01); *B01J 2219/00157* (2013.01); *C10G 2300/1055* (2013.01); *C10G 2300/1074* (2013.01); *C10G 2300/1077* (2013.01); *C10G 2300/202* (2013.01); *C10G 2300/308* (2013.01); *C10G 2300/4006* (2013.01); *C10G 2300/4012* (2013.01)

(58) Field of Classification Search
USPC .............. 422/140, 139; 208/58, 59; 196/46; 585/483, 476
See application file for complete search history.

(56) References Cited

U.S. PATENT DOCUMENTS

| | | | |
|---|---|---|---|
| 4,447,315 A | 5/1984 | Lamb et al. | |
| 4,463,206 A * | 7/1984 | Derrien | C07C 4/16 208/319 |
| 4,954,242 A | 9/1990 | Gruia | |
| 5,043,513 A * | 8/1991 | Howley | B01J 29/86 585/489 |
| 6,013,848 A * | 1/2000 | Chen | C07C 15/085 585/323 |
| 7,763,163 B2 * | 7/2010 | Koseoglu | C10G 67/06 208/99 |
| 8,343,334 B2 * | 1/2013 | Koseoglu | C10G 65/10 208/59 |
| 8,828,219 B2 | 9/2014 | Koseoglu | |

(Continued)

*Primary Examiner* — Nina Bhat
(74) *Attorney, Agent, or Firm* — Dinsmore & Shohl LLP

(57) ABSTRACT

A system for upgrading a hydrocarbon feed includes a thermal hydrodealkylation unit and a hydrocracking unit. A method for reducing formation of heavy polynuclear aromatic compounds during hydrocracking includes contacting a hydrocarbon feed comprising polynuclear aromatic compounds with hydrogen at reaction conditions sufficient to hydrodealkylate at least a portion of the polynuclear aromatic compounds in the hydrocarbon feed to produce a hydrodealkylated effluent. The method can also include contacting at least a portion of the hydrodealkylated effluent with hydrogen in the presence of a hydrocracking catalyst, where the contacting causes at least a portion of hydrocarbons in the hydrodealkylated effluent to undergo hydrocracking to produce a hydrocracked effluent. The systems and methods may reduce or prevent formation of heavy polynuclear aromatic compounds in the hydrocracking unit by hydrodealkylating heavy polynuclear aromatic precursors in the hydrocarbon feed.

20 Claims, 3 Drawing Sheets

(56) References Cited

U.S. PATENT DOCUMENTS

| | | |
|---|---|---|
| 9,394,493 B2 | 7/2016 | Koseoglu |
| 9,534,179 B2 | 1/2017 | Koseoglu |
| 9,926,240 B2 * | 3/2018 | Ward .................... C10G 45/70 |
| 2013/0165719 A1 * | 6/2013 | Negiz ................... B01J 29/076 |
| | | 585/319 |
| 2016/0362618 A1 | 12/2016 | Oprins et al. |
| 2017/0121239 A1 | 5/2017 | Fickel et al. |
| 2020/0017773 A1 * | 1/2020 | Ramamurthy ............ C07C 2/66 |

* cited by examiner

US 10,961,470 B1

THERMAL HYDRODEALKYLATION OF HYDROCRACKING FEEDSTOCK TO MITIGATE HPNA FORMATION

BACKGROUND

Field

The present disclosure relates to systems and processes for processing petroleum-based materials, in particular, systems and processes for the mitigation of heavy polynuclear aromatic formation through thermal hydrodealkylation of a hydrocracking feedstock.

Technical Background

Petrochemical feeds, such as crude oils, can be converted to chemical products and intermediates such as olefins and aromatic compounds, which are basic intermediates for a large portion of the petrochemical industry. The worldwide increasing demand for light olefins and aromatic compounds remains a major challenge for many integrated refineries. In particular, the production of some valuable light olefins such as ethylene, propylene, and butenes has attracted increased attention as pure olefin streams are considered the building blocks for polymer synthesis. Additionally, aromatic compounds such as benzene, toluene, ethylbenzene, and xylenes are valuable intermediates for synthesizing polymers and other organic compounds as well as for fuel additives.

Hydrocracking processes are used commercially in a large number of petroleum refineries. Hydrocracking processes are used to process a variety of feeds boiling in the range of 370 degrees Celsius (° C.) to 520° C. in conventional hydrocracking units and boiling at 520° C. and above in the residue hydrocracking units. In general, hydrocracking processes split the molecules of the feed into smaller, i.e., lighter, molecules having higher average volatility and economic value. Additionally, hydrocracking processes typically improve the quality of the hydrocarbon feedstock by increasing the hydrogen to carbon ratio and by removing organosulfur and organonitrogen compounds.

However, hydrocracking reaction conditions can cause formation of heavy polynuclear aromatics. Heavy polynuclear aromatics may form during the hydrocracking reactions and may lead to fouling and deactivation of hydrocracking catalysts and/or downstream equipment such as heat exchangers.

SUMMARY

A typical hydrocracking hydrocarbon feed can include sulfur-containing compounds, nitrogen-containing compounds, and polynuclear aromatic compounds with six rings or less. During hydrocracking, polynuclear aromatic compounds may react and combine to form heavy polynuclear aromatic compounds with seven rings or more. These heavy polynuclear aromatic compounds can reduce the overall efficiency of the hydrocracking unit by requiring greater operating temperatures, greater hydrogen partial pressures, additional reactor volume, additional catalyst volume, or combinations of these. These heavy polynuclear aromatics may further result in catalyst fouling or sedimentation in the hydrocracking unit or in operations downstream of the hydrocracking unit, in particular, in unit operations such as heat exchangers or separation units in which the temperature of the hydrocracked effluent is reduced.

Accordingly, there is an ongoing need for systems and processes for reducing or preventing the formation of heavy polynuclear aromatic compounds in hydrocracking processes. The systems and processes of the present disclosure address this need through the thermal hydrodealkylation of hydrocarbon feeds prior to the hydrocracking of the hydrocarbon feed. Thermal hydrodealkylation of the hydrocarbon feed may reduce heavy polynuclear aromatic precursors and polynuclear aromatic compounds. Thus, by reducing the heavy nuclear aromatic precursors, formation of heavy polynuclear aromatics during hydrocracking processes can also be reduced or prevented.

According to one or more aspects of the present disclosure, a method for reducing formation of heavy polynuclear aromatic compounds during hydrocracking may include contacting a hydrocarbon feed comprising polynuclear aromatic compounds with hydrogen at reaction conditions sufficient to hydrodealkylate at least a portion of the polynuclear aromatic compounds in the hydrocarbon feed to produce a hydrodealkylated effluent. The method may further include contacting at least a portion of the hydrodealkylated effluent with hydrogen in the presence of a hydrocracking catalyst. The contacting may cause at least a portion of hydrocarbons in the hydrodealkylated effluent to undergo hydrocracking to produce a hydrocracked effluent having a concentration of heavy polynuclear aromatic compounds less than 1,000 parts per million by weight.

In one or more other aspects of the present disclosure, a method for upgrading a hydrocarbon feed may include supplying a hydrocarbon feed and hydrogen to a thermal hydrodealkylation unit. The hydrocarbon feed comprises polynuclear aromatic compounds. The method may further include contacting the hydrocarbon feed and the hydrogen in the thermal hydrodealkylation unit. The contacting may cause at least a portion of the polynuclear aromatic compounds in the hydrocarbon feed to undergo dealkylation to produce a hydrodealkylated effluent. The method may further include passing at least a portion of the hydrodealkylated effluent to a hydrocracking unit downstream of the thermal hydrodealkylation unit. The hydrocracking unit may include a hydrocracking catalyst. The method may further include contacting the portion of the hydrodealkylated effluent with the hydrogen in the presence of the hydrocracking catalyst in the hydrocracking unit. The contacting may cause at least a portion of hydrocarbons in the portion of the hydrodealkylated feed to undergo hydrocracking reactions to produce a hydrocracked effluent comprising a concentration of heavy polynuclear aromatic compounds less than 1000 parts per million by weight.

In still other aspects of the present disclosure, a system for upgrading a hydrocarbon feed may include a thermal hydrodealkylation unit operable to contact a hydrocarbon feed comprising polynuclear aromatic compounds with hydrogen to produce a hydrodealkylated effluent, and a hydrocracking unit downstream of the thermal hydrodealkylation unit. The hydrocracking unit may include a hydrocracking catalyst and may be operable to contact at least a portion of the hydrodealkylated effluent with hydrogen in the presence of the hydrocracking catalyst to produce a hydrocracked effluent having a concentration of heavy polynuclear aromatic compounds less than 1,000 parts per million by weight.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
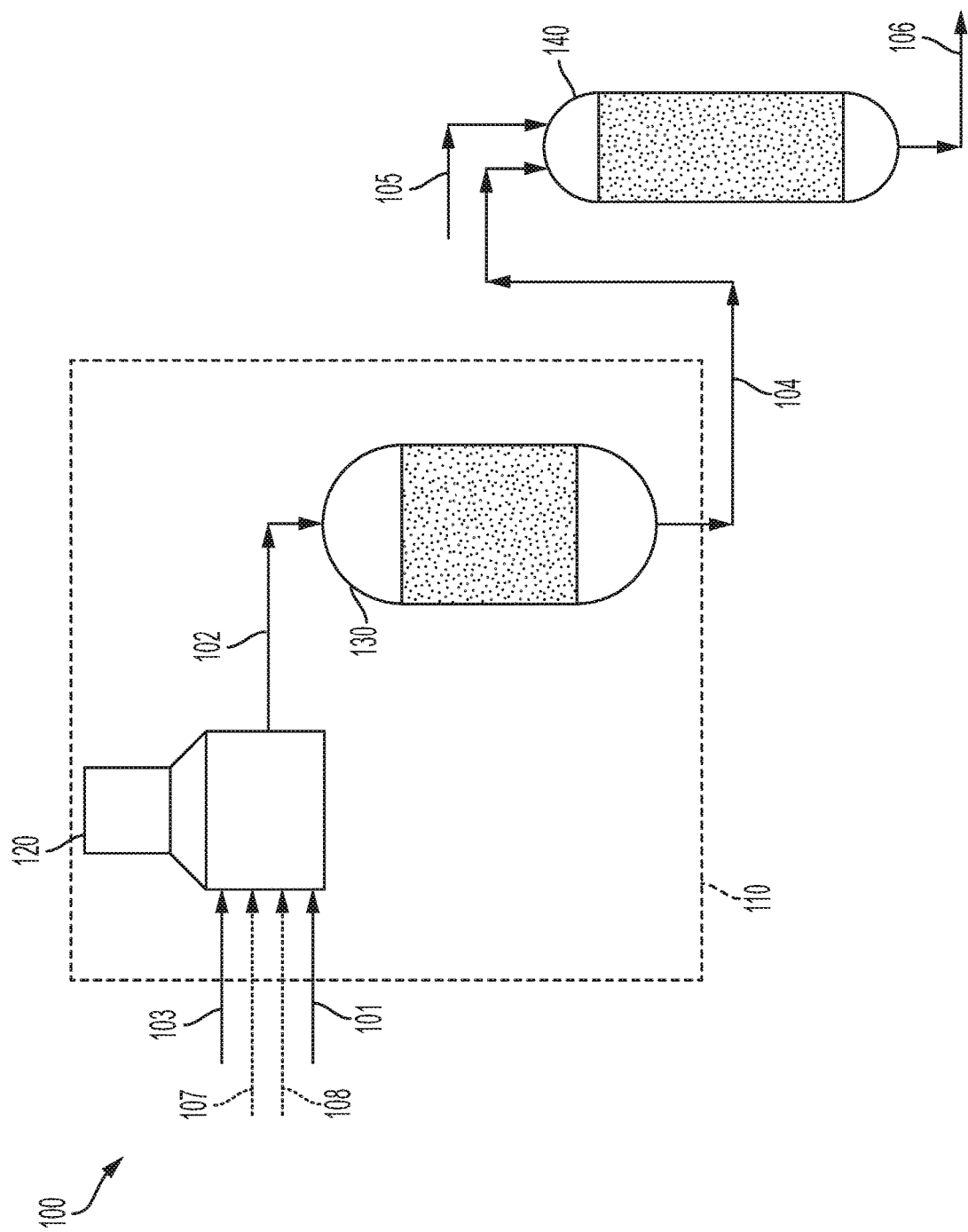
FIG. 1 schematically depicts a generalized flow diagram of a system for upgrading a hydrocarbon feed, according to one or more embodiments shown and described in this disclosure.
Figure 2:
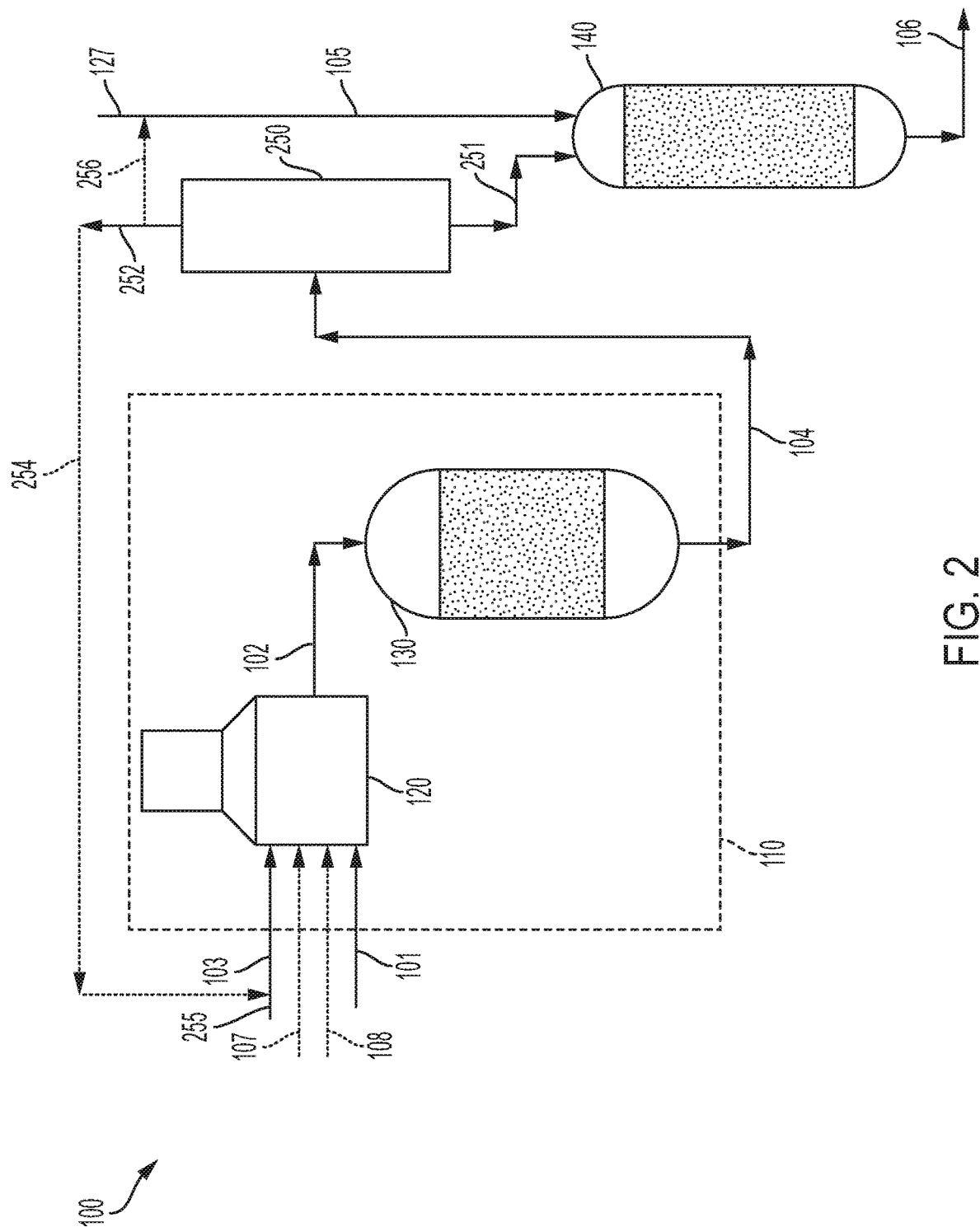
FIG. 2 schematically depicts a generalized flow diagram of a system for upgrading a hydrocarbon feed, according to one or more embodiments shown and described in this disclosure.

For the purpose of describing the simplified schematic and graphical illustrations and descriptions of FIGS. 1-2, the numerous valves, temperature sensors, electronic controllers and the like that may be employed and well known to those of ordinary skill in the art of certain chemical processing operations are not included. Further, accompanying components that are often included in chemical processing operations, such as, for example, air supplies, heat exchangers, surge tanks, or other related systems are not depicted. It would be known that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines which may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows which do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that two or more process streams are "mixed" or "combined" when two or more lines intersect in the schematic flow diagrams of FIGS. 1-2. Mixing or combining may also include mixing by directly introducing both streams into a like reactor, separation device, or other system component. For example, it should be understood that when two streams are depicted as being combined directly prior to entering a separation unit or reactor, that in some embodiments the streams could equivalently be introduced into the separation unit or reactor and be mixed in the reactor.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

The present disclosure is directed to systems and methods for reducing formation of heavy polynuclear aromatic compounds during hydrocracking. Referring to FIG. 1, one embodiment of a system 100 for reducing formation of heavy polynuclear aromatic compounds during hydrocracking is schematically depicted. The system 100 includes a thermal hydrodealkylation unit 110 operable to contact a hydrodealkylation feed 102 comprising alkylated polynuclear aromatic compounds with hydrogen 103 to produce a hydrodealkylated effluent 104 comprising hydrodealkylated polynuclear aromatic compounds. The system 100 further comprises a hydrocracking unit 140 downstream of the thermal hydrodealkylation unit 110. The hydrocracking unit 140 may include at least one hydrocracking catalyst and may be operable to contact at least a portion of the hydrodealkylated effluent 104 with hydrogen in the presence of the hydrocracking catalyst to produce a hydrocracked effluent 106 having a concentration of heavy polynuclear aromatic compounds less than 1,000 parts per million by weight (ppmw). The hydrogen may be carried through from the hydrodealkylation unit 110 to the hydrocracking unit 140 or supplemental hydrogen may be optionally added to the hydrocracking unit 140 through hydrogen stream 105. Referring now to FIG. 2, the system may further include a separation unit 250 downstream of the thermal hydrodealkylation unit 110 operable to separate the hydrodealkylated effluent 104 into at least a hydrocracking feed 251 and a hydrogen effluent 252. The separation unit 250 may be disposed directly downstream of a hydrodealkylation reactor 130 of the thermal hydrodealkylation unit 110.

Referring again to FIG. 1, a process for reducing formation of heavy polynuclear aromatic compounds during hydrocracking may include contacting a hydrodealkylation feed 102 comprising polynuclear aromatic compounds with hydrogen 103 at reaction conditions sufficient to hydrodealkylate at least a portion of the polynuclear aromatic compounds in the hydrocarbon feed 101 to produce a hydrodealkylated effluent 104. The process may further include contacting at least a portion of the hydrodealkylated effluent 104 with hydrogen 105 in the presence of a hydrocracking catalyst, where the contacting causes at least a portion of hydrocarbons in the hydrodealkylated effluent 104 to undergo hydrocracking reactions to produce a hydrocracked effluent 106 having a concentration of heavy polynuclear aromatic compounds less than 1,000 parts per million by weight.

The systems 100 and processes of the present disclosure may reduce or prevent formation of heavy polynuclear aromatic compounds (HPNAs) in hydrocracking operations. The systems 100 and processes of the present disclosure may reduce the concentration HPNA precursors in the hydrocarbon feed 101 through a thermal hydrodealkylation unit 110 upstream of the hydrocracking unit 140. By thermally dealkylating the hydrocarbon feed 101, HPNA precursors may be reduced or eliminated. This, in turn, may reduce or prevent HPNA formation during hydrocracking, which may result in reduced fouling of the hydrocracking catalysts and reduced sedimentation in unit operations downstream of the hydrocracking unit 140.

As used in this disclosure, the term "reactor" may refer to any vessel, container, or the like, in which one or more chemical reactions may occur between one or more reactants optionally in the presence of one or more catalysts. For example, a reactor may include a tank or tubular reactor configured to operate as a batch reactor, a continuous stirred-tank reactor (CSTR), or a plug flow reactor. Example reactors include packed bed reactors such as fixed bed reactors, and ebullated bed reactors. One or more "reaction zones" may be disposed within a reactor. As used in this disclosure, a "reaction zone" refers to an area where a particular reaction takes place in a reactor. For example, a packed bed reactor with multiple catalyst beds may have multiple reaction zones, where each reaction zone is defined by the area of each catalyst bed.

As used in this disclosure, the term "separation unit" may refer to any separation device that at least partially separates one or more chemicals in a mixture from one another. For example, a separation unit may selectively separate different chemical species from one another, forming one or more chemical fractions. Examples of separation units include, without limitation, distillation columns, fractionators, flash drums, knock-out drums, knock-out pots, centrifuges, filtration devices, traps, scrubbers, expansion devices, membranes, solvent extraction devices, high-pressure separators, low-pressure separators, and the like. It should be understood that separation processes described in this disclosure may not completely separate all of one chemical constituent from all of another chemical constituent. It should be understood that the separation processes described in this disclosure "at least partially" separate different chemical components from one another, and that even if not explicitly stated, it should be understood that separation may include only partial separation. As used in this disclosure, one or more chemical constituents may be "separated" from a process stream to form a new process stream. Generally, a process stream may enter a separation unit and be divided or separated into two or more process streams, each process stream having a different composition.

As used in this disclosure, the term "fractionation" may refer to a process of separating one or more constituents of a composition in which the constituents are divided from each other during a phase change based on differences in properties of each of the constituents. As an example, as used in this disclosure, "distillation" may refer to separation of constituents of a liquid composition based on differences in the boiling point temperatures of constituents of the liquid composition.

Further, in some separation processes, a "lesser-boiling effluent" and a "greater-boiling effluent" may separately exit the separation unit. In general, the lesser-boiling effluent has a lesser boiling point temperature than the greater-boiling effluent. Some separation systems may produce a "middle-boiling effluent," which may include constituents having boiling point temperatures between the boiling point temperatures of the lesser-boiling effluent and the greater-boiling effluent. The middle-boiling effluent may be referred to as a middle distillate. Some separation systems may be operable to produce a plurality of streams, each with a different boiling point range. It should be additionally understood that where only one separation unit is depicted in a figure or described, two or more separation units may be employed to carry out the identical or substantially identical separations. For example, where a distillation column with multiple outlets is described, it is contemplated that several separators arranged in series may equally separate the feed stream, and such embodiments are within the scope of the presently described embodiments.

As used in this disclosure, the terms "upstream" and "downstream" may refer to the relative positioning of unit operations with respect to the direction of flow of the process streams. A first unit operation of a system may be considered "upstream" of a second unit operation if process streams flowing through the system encounter the first unit operation before encountering the second unit operation. Likewise, a second unit operation may be considered "downstream" of the first unit operation if the process streams flowing through the system encounter the first unit operation before encountering the second unit operation.

As used in the present disclosure, passing a stream or effluent from one unit "directly" to another unit may refer to passing the stream or effluent from the first unit to the second unit without passing the stream or effluent through an intervening reaction system or separation system that substantially changes the composition of the stream or effluent. Heat transfer devices, such as heat exchangers, preheaters, coolers, condensers, or other heat transfer equipment, and pressure devices, such as pumps, pressure regulators, compressors, or other pressure devices, are not considered to be intervening systems that change the composition of a stream or effluent. Combining two streams or effluents together also is not considered to comprise an intervening system or unit operation that changes the composition of one or both of the streams or effluents being combined.

As used in this disclosure, the term "end boiling point" or "EBP" of a composition may refer to the temperature at which the greatest boiling temperature constituents of the composition transition from the liquid phase to the vapor phase.

As used in this disclosure, the term "effluent" may refer to a stream that is passed out of a reactor, a reaction zone, or a separation unit following a particular reaction or separation. Generally, an effluent has a different composition than the stream that entered the separation unit, reactor, or reaction zone. It should be understood that when an effluent is passed to another system unit, only a portion of that system stream may be passed. For example, a slip stream may carry some of the effluent away, meaning that only a portion of the effluent may enter the downstream system unit. The term "reaction effluent" may more particularly be used to refer to a stream that is passed out of a reactor or reaction zone.

As used in this disclosure, the term "catalyst" may refer to any substance that increases the rate of a specific chemical reaction. Catalysts described in this disclosure may be utilized to promote various reactions, such as, but not limited to, dealkylation, hydrocracking, cracking, or combinations of these.

As used in this disclosure, the term "dealkylation" may refer to a chemical reaction where a molecule, such as an alkyl aromatic compound, having one or more alkyl groups attached to an aromatic ring is broken into more than one molecule by the breaking of one or more carbon-carbon bonds, where at least one of the resulting molecules is the alkyl group.

As used in this disclosure, the term "cracking" may refer to a chemical reaction where a molecule having carbon-carbon bonds is broken into more than one molecule by the breaking of one or more of the carbon-carbon bonds; where a compound including a cyclic moiety, such as an aromatic compound, is converted to a compound that does not include a cyclic moiety; or where a molecule having carbon-carbon double bonds are reduced to carbon-carbon single bonds. Some catalysts may have multiple forms of catalytic activity, and calling a catalyst by one particular function does not render that catalyst incapable of being catalytically active for other functionality. As used throughout the present disclosure, "hydrocracking" may refer to catalytic cracking of hydrocarbons conducted in the presence of hydrogen.

As used in this disclosure, the term "crude oil" or "whole crude oil" may refer to crude oil received directly from an oil field or from a desalting unit without having any fraction separated by distillation.

As used in this disclosure, the term "polynuclear aromatic compounds" or "PNA" may refer to compounds containing less than seven fused benzene rings. The term "fused" may refer to a benzene ring comprising two or more carbon atoms in the ring that are shared with an adjacent benzene ring rather than being coupled to the adjacent benzene ring through an alkyl group. Naphthalene is a non-limiting example of a polynuclear aromatic compound having 2 fused benzene rings as compared to a compound such as biphenyl in which the two benzene rings are coupled together through an alkyl group. These example compounds are provided as non-limiting examples and are not intended to limit the scope of the term polynuclear aromatic compounds or heavy polynuclear aromatic compounds.

As used in this disclosure, the term "heavy polynuclear aromatic compounds" or "HPNA" may refer to compounds containing greater than or equal to seven fused benzene rings.

As used in this disclosure, the term "heavy polynuclear aromatic precursors" or "HPNA precursors" may refer to a subset of polynuclear aromatic compounds that include the alkyl groups that enable polynuclear aromatic compounds to join together to form heavy polynuclear aromatic compounds.

It should further be understood that streams may be named for the components of the stream, and the component for which the stream is named may be the major component of the stream (such as comprising from 50 wt. %, from 70 wt. %, from 90 wt. %, from 95 wt. %, from 99 wt. %, from 99.5 wt. %, or even from 99.9 wt. % of the contents of the stream to 100 wt. % of the contents of the stream). It should also be understood that components of a stream are disclosed as passing from one system component to another when a stream comprising that component is disclosed as passing from that system component to another. For example, a disclosed "hydrogen stream" passing to a first system component or from a first system component to a second system component should be understood to equivalently disclose "hydrogen" passing to the first system component or passing from a first system component to a second system component.

Referring again to FIG. 1, a system 100 of the present disclosure for upgrading a hydrocarbon feed 101 is schematically depicted. The system 100 may include the thermal hydrodealkylation unit 110 and the hydrocracking unit 140 downstream of the thermal hydrodealkylation unit 110. The thermal hydrodealkylation unit 110 may include a furnace 120 and the hydrodealkylation reactor 130 downstream of the furnace 120 and upstream of the hydrocracking unit 140. Referring to FIG. 2, the system 100 may also include a separation unit 250 downstream of the thermal hydrodealkylation unit 110 and upstream of the hydrocracking unit 140.

Referring again to FIG. 1, the hydrocarbon feed 101 may comprise one or more alkylated polynuclear aromatic compounds (PNA). The hydrocarbon feed 101 may include one or more heavy oils, such as, but not limited to, crude oil, vacuum residue, tar sands, bitumen, atmospheric residue, vacuum gas oils (VGO), other heavy oil streams, de-metalized oil (DMO), de-asphalted oil (DAO), or combinations of these. It should be understood that, as used in this disclosure, a "heavy oil" may refer to a raw hydrocarbon, such as crude oil, which has not been previously processed through distillation, or may refer to a hydrocarbon which has undergone some degree of processing prior to being introduced to the system 100 as the hydrocarbon feed 101. The hydrocarbon feed 101 may have a density less than or equal to 1.00 gram per milliliter or from greater than or equal to 0.85 grams per milliliter to less than or equal to 1.00 gram per milliliter. The hydrocarbon feed 101 may have an end boiling point (EBP) of less than 1000° C., or less than 750° C., such as from greater than 620° C. to less than 750° C. The hydrocarbon feed 101 may have a concentration of nitrogen of less than or equal to 3000 parts per million by weight, or less than or equal to 2000 ppmw, such as from greater than or equal to 900 to less than or equal to 2000 ppmw.

When the hydrocarbon feed 101 comprises a crude oil, the crude oil may be a whole crude or may be a crude oil that has undergone at some processing, such as desalting, solids separation, scrubbing. For example, the hydrocarbon feed 101 may be a de-salted crude oil that has been subjected to a de-salting process. The hydrocarbon feed 101 may include a crude oil that has not undergone pretreatment, separation (such as distillation), or other operation that changes the hydrocarbon composition of the crude oil prior to introducing the crude oil to the system 100. Alternatively or additionally, the hydrocarbon feed 101 may include one or more of a vacuum residue, vacuum gas oil (VGO), de-asphalted oil (DAO), or de-metalized oil (DMO).

In embodiments, one example of a hydrocarbon feed 101 may be as VGO boiling in the nominal range of 370° C. to 565° C. DMO or DAO may be blended with the vacuum gas oil and processed in a hydrocracking unit. For instance, a hydrocracking unit may process vacuum gas oils that contain from 10% by volume to 99% by volume of DMO or DAO for optimum operation. In embodiments, DMO or DAO can also be processed for difficult operations. However, the DMO or DAO stream comprises significantly more nitrogen compounds (2,000 parts per million by weight (ppmw) vs. 1,000 ppmw) and a higher micro carbon residue (MCR) content than the VGO stream (10 weight percent (wt. %) vs. <1 wt. %). The DMO or DAO stream may comprise nitrogen compounds in an amount of 2,000 ppmw, whereas the VGO may comprise nitrogen compounds in an amount of 1,000 ppmw. Similarly, the DMO or DAO stream may comprise MCR in an amount of 10 wt. % ppmw, whereas the VGO may comprise MCR in an amount of less than 1 wt. %. In embodiments, the hydrocarbon feed 101 may have a PNA concentration of from 1 wt. % by volume to 75 wt. % by volume. The hydrocarbon feed 101 may comprise PNAs with a carbon number in the range of greater than or equal to 14 and less than or equal to 100, or greater than or equal to 14 and less than or equal to 65.

During hydrocracking, the formation of HPNAs is an undesirable side reaction that occurs in hydrocracking units. HPNAs may form from the dehydrogenation of larger hydrocarbon molecules or from the cyclization of side chains onto existing PNAs, HPNA precursors, or HPNAs followed by dehydrogenation. The amount of HPNA formation is dependent on the properties of the feedstock, catalyst selection, process configuration, and operating conditions.

As previously discussed, these HPNAs can lower the overall efficiency of the hydrocracking unit by requiring higher operating temperatures, higher hydrogen partial pressures, additional reactor volume, additional catalyst volume, or combinations of these. These heavy polynuclear aromatics may further result in catalyst fouling or sedimentation downstream. During hydrocracking, HPNAs may accumulate in a recycle system, exacerbating the problems associated with HPNA formation.

Similarly, the DMO or DAO blended with VGO, or other hydrocarbon feeds, may also lower the overall efficiency of the hydrocracking unit by requiring higher operating temperatures, higher hydrogen partial pressures, additional reactor volume, additional catalyst volume, or combinations of these. DMO or DAO may also reduce the quality of the desired intermediate hydrocarbons in the hydrocracked effluent. In embodiments where DMO or DAO is blended with the hydrocarbon feed, further processing of the hydrocracked effluent may be necessary to produce products of the desired quality.

While various attempts have been made to mitigate HPNA formation during hydrocracking, these attempts have proven to be insufficient. Such attempts to mitigate HPNA formation include adsorption processes. These attempts may further process the hydrocarbon feed or the hydrocracked effluent in an adsorption unit with an adsorbent. The adsorbent may reduce the concentration of PNAs or HPNAs in the hydrocracked effluent. However, PNAs and HPNAs can still be present in the hydrocracked effluents. Thus, these attempts are not sufficient as PNAs, HPNA precursors, and HPNAs are still being fed to the hydrocracking unit. Thus, the HPNAs are still forming during hydrocracking.

Accordingly, mitigation of PNAs, HPNA precursors, or HPNAs prior to the introduction of the hydrocracking feed to the hydrocracking unit is still needed. Not intending to be bound or limited by any particular theory, it is believed that dealkylating the PNAs and HPNA precursors in the hydrocracking feed through hydrodealkylation upstream of the hydrocracking unit may reduce the number of alkyl groups on the aromatic rings of the PNA and HPNA precursors. Reducing the number of alkyl groups on the aromatic rings of the PNA and HPNA precursors may reduce the number of linkage sites at which PNA compounds and HPNA precursors can combine to form HPNAs during the hydrocracking process. Again, not intending to be bound by any particular theory, it is believed that dealkylating the PNAs and HPNA precursors may increase the overall efficiency of the hydrocracking unit by mitigating the formation of HPNAs.

Referring again to FIG. 1, the hydrocarbon feed 101 may be dealkylated in the thermal hydrodealkylation unit 110. The hydrocarbon feed 101 may be introduced directly to the thermal hydrodealkylation unit 110 or may be combined with hydrogen 103 upstream of the thermal hydrodealkylation unit 110. Referring to FIG. 2, the hydrogen 103 may be recycled hydrogen 254 recovered from the system 100, such as from the separation unit 250. The hydrogen 103 may also include supplemental hydrogen 255 from an external hydrogen source (not shown) or hydrogen produced by another process within the battery limits of the facility. The hydrogen 103, such as recycled hydrogen 254, supplemental hydrogen 255, or both, may be passed directly to the thermal hydrodealkylation unit 110 or combined with the hydrocarbon feed 101 upstream of the thermal hydrodealkylation unit 110.

The thermal hydrodealkylation unit 110 may be operable to contact a hydrocarbon feed 101 comprising alkylated polynuclear aromatic compounds with hydrogen 103 at reaction conditions sufficient to produce a hydrodealkylated effluent 104. The thermal hydrodealkylation unit 110 may comprise a furnace 120 and a hydrodealkylation reactor 130 downstream of the furnace 120. The furnace 120 may be operable to preheat the hydrocarbon feed 101 to produce a hydrodealkylation feed 102 having a temperature sufficient to conduct the thermal hydrodealkylation reaction. In embodiments, the hydrocarbon feed may be preheated in feed/effluent exchangers installed at the reactor 130 or reactor 140 outlet (not shown) and then heated in the furnace 120. The temperature sufficient to conduct the thermal hydrodealkylation reaction may be a temperature at or above the reaction temperature in the hydrodealkylation reactor 130. The furnace 120 may be operable to preheat the hydrocarbon feed 101 to a temperature of from 550° C. to 800° C., from 600° C. to 700° C., from 625° C. to 700° C., or from 600° C. to 675° C. The hydrodealkylation reactor 130 may be directly downstream of the furnace 120 so that the hydrodealkylation feed 102 may be passed from an outlet of the furnace 120 directly to the inlet of the hydrodealkylation reactor 130. The outlet of the furnace 120 may be directly and fluidly coupled to the inlet of the hydrodealkylation reactor 130.

The hydrodealkylation reactor 130 may be operable to contact the hydrodealkylation feed 102 with the hydrogen 103 to produce the hydrodealkylated effluent 104. The hydrodealkylation reactor 130 may be operable to contact the hydrodealkylation feed 102 with the hydrogen 103 in the presence of a hydrodealkylation catalyst to produce the hydrodealkylated effluent 104. The hydrodealkylation reactor 130 may include any type of reactor suitable for contacting the hydrodealkylation feed 102 with the hydrogen 103 and, optionally, in the presence of a homogeneous hydrodealkylation catalyst. The hydrodealkylation reactor 130 may include, but is not limited to, one or more pressure vessels, tubular reactors, plug flow reactors, fixed bed reactors, moving bed reactors, fluidized bed reactors, other type of reactor, or combinations of reactors. In embodiments, the hydrodealkylation reactor 130 can be a tubular reactor.

Referring to FIGS. 1 and 2, as previously discussed, the hydrodealkylation reactor 130 may optionally include a hydrodealkylation catalyst. The hydrodealkylation catalyst in the hydrodealkylation reactor 130 may comprise a homogenous catalyst. The homogenous catalyst may be oil soluble. The hydrodealkylation catalyst in the hydrodealkylation reactor 130 may include one or more metals selected from the metallic elements in Groups 4, 5, or 6 of the International Union of Pure and Applied Chemistry (IUPAC) periodic table, such as, but not limited to, molybdenum, tungsten, vanadium, titanium, or combinations of these. The metals of the hydrodealkylation catalyst may be present as metal oxides, metal sulfides, organo-metallics or combinations of these. The hydrodealkylation reactor 130 may be operable to contact the hydrodealkylation feed 102 with hydrogen 103 without the presence of a hydrodealkylation catalyst. In embodiments, the hydrodealkylation reactor 130 may not include a solid hydrodealkylation catalyst.

The hydrodealkylation feed 102 may be contacted with the hydrogen 103, optionally in the presence of the hydrodealkylation catalyst, in the hydrodealkylation reactor 130 at a temperature and pressure sufficient to dealkylate at least a portion of the PNAs and other heavy polynuclear aromatic precursors, which may reduce or prevent the formation of heavy polynuclear aromatic compounds in the downstream hydrocracking unit 140. The hydrodealkylation reactor 130 may be operated at a temperature of from 550° C. to 800° C., or from 650° C. to 700° C. The hydrodealkylation reactor 130 may be operated at a pressure of from 10 MPA to 20 MPa, or from 12 MPa to 18 MPa. The hydrodealkylation reactor 130 may be operated with a residence time of from 0.1 seconds to 30 seconds, from 0.5 seconds to 10 seconds, or from 1 second to 5 seconds. The residence time in the hydrodealkylation reactor 130 may be the average time that the reactants are in contact with each other at the reaction temperature and pressure. The volume ratio of hydrogen 103 to the hydrocarbon feed 101 introduced to the thermal hydrodealkylation unit 110 may be from 1500:1 to 3000:1, from 2000:1 to 2750:1, or less than or equal to 2500:1.

Contact of the hydrocarbon feed 101 with the hydrogen 103, optionally in the presence of the hydrodealkylation catalyst, in the thermal hydrodealkylation unit 110 may result in an average carbon number of the hydrodealkylated effluent 104 that is less than an average carbon number of the hydrocarbon feed 101 by at least 2 percent (%), at least 5%, at least 10%, at least 25%, at least 50%, or even at least 75%. In embodiments, the average carbon number of hydrodealkylated effluent 104 may be from 2% to 99%, from 50% to 95%, or from 75% to 90% of the average carbon number of the hydrocarbon feed 101. As used herein, "average carbon number" refers to average number of carbon atoms in each molecule. Average carbon number is determined by Fourier-Transform ion cyclotron Mass Spectrometry. In embodiments, the hydrodealkylated effluent 104 may comprise PNAs with a carbon number in the range of greater than or equal to 14 and less than or equal to 65.

Referring to FIG. 2, the system 100 may also include a separation unit 250 downstream of the thermal hydrodealkylation unit 110. The separation unit 250 may be disposed directly downstream of the hydrodealkylation reactor 130 of the thermal hydrodealkylation unit 110 so that the hydrodealkylated effluent 104 can be passed directly from the hydrodealkylation reactor 130 to the separation unit 250. The inlet of the separation unit 250 may be in direct fluid communication with an outlet of the hydrodealkylation reactor 130 with no intervening unit operations disposed between the hydrodealkylation reactor 130 and the separation unit 250. The separation unit 250 may include one or a plurality of separation units operable to separate the hydrodealkylated effluent 104 into at least a hydrocracking feed 251 and a hydrogen effluent 252. When a plurality of separation units are present, the separation units of the separation unit 250 may be operated in parallel or in series.

The separation unit 250 may be operable to separate the hydrodealkylated effluent 104 into at least a hydrocracking feed 251 and a hydrogen effluent 252. In embodiments, the process may comprise separating the hydrodealkylated effluent 104 to produce a hydrogen effluent 252 and a hydrocracking feed 251. The hydrocracking feed 251 may include at least 90 percent (%) by weight, at least 95% by weight, at least 97% by weight, or at least 99% by weight of the hydrocarbons from the hydrodealkylated effluent 104. The hydrogen effluent 252 may include at least 95% by weight, at least 98% by weight, or even at least 99% by weight of the hydrogen remaining in the hydrodealkylated effluent 104. The hydrogen effluent 252 may also include other light gases, such as but not limited to, steam or light hydrocarbon gases such as methane. A portion of the hydrogen effluent 252 may be recycled back into contact with the hydrocarbon feed 101. A portion of the hydrogen effluent 252 that may be recycled back into contact with the hydrodealkylation feed 102 may be combined with supplemental hydrogen 255 from an external hydrogen source (not shown) prior to being recycled back into contact with the hydrodealkylation feed 102. The hydrogen 103, such as a portion of the hydrogen effluent 252, supplemental hydrogen 255, or both, may be passed directly to the hydrodealkylation reactor 130 or combined with the hydrodealkylation feed 102 upstream of the hydrodealkylation reactor 130.

When present, hydrodealkylation catalysts may be at least partially deactivated by deposition of contaminants, such as coke or asphaltenes, on the surfaces of the hydrodealkylation catalyst. As previously discussed, thermal hydrodealkylation of hydrocarbons in the hydrocarbon feed 101 may modify the compounds that stabilize the solution of asphaltenes and other coke precursors in the hydrocarbon feed 101, which may break down the stabilization system for asphaltenes and other coke precursors. Upon the alteration of the stabilization system, the asphaltenes and other coke precursors may precipitate in the hydrodealkylation reactor 130. The precipitated asphaltenes may deposit on the surfaces of the hydrodealkylation catalyst. Coke precursors in the hydrocarbon feed 101 may produce coke at the reaction conditions of the hydrodealkylation reaction, and the coke may also deposit on the surfaces of the hydrodealkylation catalyst. Thus, the presence of asphaltenes and other coke precursors in the hydrocarbon feed 101 may reduce the activity and service life of the hydrodealkylation catalyst in the thermal hydrodealkylation unit 110. Even small amounts of asphaltenes and coke precursors, such as less than 0.5 wt. % in the hydrocarbon feed 101 can cause problems with hydrodealkylation catalyst deactivation and disrupt smooth steady-state continuous operation of the system 100.

One or more compounds may be introduced to the thermal hydrodealkylation unit 110 to reduce coke formation and reduce catalyst deactivation caused by the deposition of contaminants on the hydrodealkylation catalyst. Referring to FIGS. 1 and 2, steam 107 may be introduced to the thermal hydrodealkylation unit 110 to reduce coke or asphaltene formation. Additionally or alternatively, a disulfide oil 108 may be introduced to the thermal hydrodealkylation unit 110 to reduce coke or asphaltene formation. For example, dimethyldisulfide may be introduced to the thermal hydrodealkylation unit 110 to reduce coke or asphaltene formation.

Referring again to FIGS. 1 and 2, the hydrodealkylated effluent 104 or hydrocracking feed 251 may be passed to the hydrocracking unit 140, which may be disposed downstream of the thermal hydrodealkylation unit 110. Referring to FIG. 1, the hydrocracking unit 140 may be directly downstream of the hydrodealkylation reactor 130 so that the hydrodealkylated effluent 104 may be passed directly from the hydrodealkylation reactor 130 to the hydrocracking unit 140. An inlet of the hydrocracking unit 140 may be in direct fluid communication with an outlet of the hydrodealkylation reactor 130 with no intervening unit operations disposed between them. Referring to FIG. 2, the separation unit 250 may be disposed between the hydrodealkylation reactor 130 and the hydrocracking unit 140. The hydrocracking unit 140 may be directly downstream of the separation unit 250 so that the hydrocracking feed 251 may be passed directly from the separation unit 250 to the hydrocracking unit 140. An inlet of the hydrocracking unit 140 may be in direct fluid communication with a hydrocracking feed outlet of the separation unit with no intervening unit operations disposed between them.

The hydrocracking unit 140 may include at least one hydrocracking catalyst. The hydrocracking unit 140 may be operable to contact at least a portion of the hydrodealkylated effluent 104 or hydrocracking feed 251 with hydrogen 105 in the presence of the hydrocracking catalyst to produce a hydrocracked effluent 106 having a concentration of heavy polynuclear aromatic compounds less than 1,000 parts per million by weight (ppmw). In the hydrocracking unit 140, saturated polyaromatic compounds and other larger molecular weight hydrocarbons in the hydrodealkylated effluent 104 or hydrocracking feed 251 may be converted to smaller, lesser-boiling hydrocarbons through contact of the hydrodealkylated effluent 104 or hydrocracking feed 251 with the hydrogen 105 in the presence of the hydrocracking catalyst.

The hydrocracking unit 140 may be any type of reactor operable to contact the hydrodealkylated effluent 104 with the hydrocracking catalyst in the hydrocracking unit 140. Suitable reactors for the hydrocracking unit 140 may include, but are not limited to, pressure vessels, fixed bed reactors, moving bed reactors, ebullated bed reactors, slurry bed reactors, plug flow reactors, other type of reactor, or combinations of reactors. For example, the hydrocracking unit 140 may include one or more fixed bed reactors, which may be operated in downflow, upflow, or horizontal flow configurations. In some embodiments, the hydrocracking unit 140 may include a plurality of reactors, either in series or in parallel.

The hydrocracking unit 140 of the present disclosure can include a single-stage once through hydrocracking unit, a series-flow hydrocracking unit with or without recycle of one or more effluent streams, or a two-stage recycle hydrocracking unit. Single-stage once through hydrocracking units are the simplest hydrocracking scheme and may be conducted at operating conditions that are more severe than hydrotreating processes, but less severe than conventional full pressure hydrocracking processes. Single-stage once through hydrocracking may use one or more reactors for both the hydrotreating steps and hydrocracking reaction. Therefore, the single-stage hydrocracking process may use a hydrocracking catalyst capable of both hydrotreating and hydrocracking. This configuration can be cost effective, but may result in reduced product yields compared to other hydrocracking process schemes. Single-stage once-through hydrocracking may increase middle-distillate yield compared to single or dual catalyst hydrocracking systems. The hydrocracking unit 140 may include a once-through hydrocracking system that can be a dual catalyst hydrocracking system. The dual catalyst hydrocracking system can include at least two different hydrotreating/hydrocracking catalysts arranged in a stacked-bed configuration in a single reactor or in two different reactors operated in series. The hydrocracking effluents can be passed to a hydrocracker effluent separation system, such as a fractionator column, operable to separate the $H_2S$, $NH_3$, light gases ($C_1$-$C_4$), naphtha, and diesel products boiling in the temperature range of 36° C. to 370° C. The hydrocarbons boiling above 370° C. can include unconverted bottoms that, in single stage systems, can be passed to other refinery operations.

In embodiments, the hydrocracking unit 140 can be a series-flow hydrocracking system with or without recycle of at least a portion of the unconverted bottoms back to one or more of the hydrocracking reactors. The series-flow hydrocracking system may include a single reactor (containing both treating and cracking catalysts) or two or more reactors for both hydrotreating and hydrocracking reaction steps. The unconverted bottoms from the fractionator column may be recycled back into the first reactor for further hydrocracking. This configuration may convert heavy crude oil fractions into light products and may increase the yield of naphtha, jet fuel, or diesel, depending on the recycle cut point used in the distillation section.

In embodiments, the hydrocracking unit 140 can be a two-stage recycle hydrocracking system. A two-stage recycle hydrocracking system may include two reactors. In a two-stage configuration, the reactor effluents from both first stage (hydrotreating) and second stage (hydrocracking) reactor are sent to a separation (separate) and fractionation system (common). The unconverted bottoms from the fractionation column may be recycled back into the second reactor for additional hydrocracking. The first reactor may accomplish both hydrotreating and hydrocracking. Accordingly, the feed to second reactor may comprise reduced $H_2S$ and $NH_3$. This reduction in $H_2S$ and $NH_3$ may permit the use of high performance zeolite catalysts that may otherwise be susceptible to poisoning by sulfur or nitrogen compounds.

Referring again to FIGS. 1 and 2, hydrogen may be introduced to the hydrocracking unit 140 with the hydrodealkylated effluent 104 or hydrocracking feed 251. Referring to FIG. 1, in embodiments, supplemental hydrogen may be introduced to the hydrocracking unit through hydrogen stream 105. The supplemental hydrogen from hydrogen stream 105 may be optional, as sufficient hydrogen may already be in the hydrodealkylated effluent 104, such that no additional hydrogen is necessary for hydrocracking. Referring to FIG. 2, when present, the hydrogen stream 105 introduced to the hydrocracking unit 140 may be recycled hydrogen 256 recovered from the system 100, such as from the separation unit 250 or hydrogen 257 from an external hydrogen source (not shown). When present, the hydrogen stream 105, such as recycled hydrogen 256, supplemental hydrogen 257, or both, may be passed directly to the hydrocracking unit 140 or combined with the hydrodealkylated effluent 104 or hydrocracking feed 251 upstream of the hydrocracking unit 140.

The hydrocracking catalyst may be a solid particulate catalyst capable of promoting or increasing the reaction rate of the hydrocracking reactions of the hydrodealkylated effluent 104 or hydrocracking feed 251 in the presence of hydrogen 105. Suitable hydrocracking catalysts may include, but are not limited to, zeolite catalysts. Examples of zeolite catalysts suitable for use as the hydrocracking catalyst may include, but are not limited to, Y-type zeolites, REY-type zeolites, USY-type zeolties, RE-USY-type zeolites, mordenite framework inverted (MFI) type zeolites, beta zeolites, or combinations of these. The hydrocracking catalyst may be a hierarchical zeolite containing hydrocracking catalyst, such as but not limited to a hierarchical beta zeolite, a hierarchical Y-zeolite, or other hierarchical zeolite. Hierarchical zeolites may refer to zeolites that have an average pore size of from 2 nm to 40 nm, or from 5 nm to 25 nm as determined using the Barrett-Joyner-Halinda (BJH) method. Hierarchical zeolites may be prepared by subjecting a microporous beta zeolite or Y-zeolite to a desilication process or by synthesizing the beta zeolite or Y-zeolite using a templating agent or pore-directing agent to achieve the desired hierarchical pore structure. Hierarchical zeolites may be post modified by dealumination, followed by the insertion of other transition metals such as Ti, Zr, Hf into the framework of the zeolite.

The hydrocracking catalyst in the hydrocracking unit 140 may additionally include one or a plurality of metals supported on the surfaces of the zeoltites. The hydrocracking catalysts in the hydrocracking unit 140 may include one or a plurality of metals selected from the metallic elements in Groups 6, 7, 8, 9, or 10 of the IUPAC periodic table supported on the zeolite or hierarchical zeolite. Example metals for the hydrocracking catalysts of the hydrocracking unit 140 may include but are not limited to molybdenum, cobalt, tungsten, nickel, platinum, palladium, or combinations of these. In one or more embodiments, the hydrocracking catalyst in the hydrocracking unit 140 may include nickel and molybdenum supported on a Y-zeolite or beta zeolite support.

The hydrocracking unit 140 may be operated under conditions sufficient to promote or increase the reaction rate of the hydrocracking reactions to produce the hydrocracked effluent 106 having increased concentrations of smaller, lesser-boiling hydrocarbons, such as but not limited to $C_2$ to $C_{10}$ paraffins and other hydrocarbons having boiling temperatures less than or equal to 180° C. (naphtha). The hydrodealkylated effluent 104 or hydrocracking feed 251 may be contacted with the hydrogen 105 in the presence of the hydrocracking catalyst in the hydrocracking unit 140 at a hydrocracking temperature and hydrocracking pressure sufficient to cause at least a portion of the hydrocarbons from the hydrodealkylated effluent 104 or hydrocracking feed 251 to undergo hydrocracking reactions produce smaller, lesser-boiling hydrocarbons having boiling point temperatures less than or equal to 180° C. The hydrocracking unit 140 may be operated at a hydrocracking temperature of from 300° C. to 450° C., from 320° C. to 430° C., from 340° C. to 410° C., or from 350° C. to 400° C. The hydrocracking unit 140 may be operated at a hydrocracking pressure of from 10 MPa to 20 MPa, 12 MPa to 18 MPa, 12 MPa to 16 MPa, or from 14 MPa to 18 MPa. The hydrocracking unit 140 may operate with a residence time of from 30 minutes to 120 minutes, from 45 minutes to 90 minutes, from 60 minutes to 120 minutes, or from 30 minutes to 90 minutes. The residence time in the hydrocracking unit 140 may be the average time that the reactants are in contact with the hydrocracking catalyst at the reaction conditions. The volume ratio of hydrogen 105 to the hydrodealkylated effluent 104 or hydrocracking feed 251 introduced to the hydrocracking unit 140 may be from 800:1 to 1200:1, from 900:1 to 1200:1, from 800:1 to 1100:1, from 900:1 to 1100:1. The hydrogen 105 may be introduced to the hydrocracking unit 140 at the inlet of the hydrocracking unit 140.

Hydrocracking units 140 may be at least partially susceptible to fouling by the formation of heavy polynuclear aromatic compounds in the hydrocracking unit. As previously discussed, a hydrocracking feed can include heavy polynuclear aromatic precursors, such as but not limited to polynuclear aromatic compounds. During hydrocracking, heavy polynuclear aromatics tend to form from those heavy polynuclear aromatic precursors in the hydrocracking feed in high concentration in the unconverted hydrocracking effluent. The presence of these polynuclear aromatics, which lead to the formation of heavy polynuclear aromatics, may require higher operating temperature, higher hydrogen partial pressure, or additional hydrocracking catalyst volume. Further, high concentrations of heavy polynuclear aromatic precursors, which lead to the formation of heavy polynuclear aromatics, may accelerate catalyst deactivation.

The hydrodealkylated effluent 104 passed out of the thermal hydrodealkylation unit 110 may have a reduced concentration of heavy polynuclear aromatic precursors compared to the hydrocarbon feed 101. As previously discussed, hydrodealkylation of the hydrocarbon feed 101 in the thermal hydrodealkylation unit 110 may reduce or eliminate heavy polynuclear aromatic precursors by hydrodealkylation, which may reduce or prevent formation of heavy polynuclear aromatic compounds in the hydrocracking unit 140. When the hydrodealkylated effluent 104 or hydrocracking feed 251 is passed to the hydrocracking unit 140 and contacted with hydrogen 105 in the presence of the hydrocracking catalyst, the formation of heavy polynuclear aromatics may be reduced compared to hydrocracking the hydrocarbon feed 101 without first hydrodealkylating the hydrocarbon feed 101.

As previously discussed, the hydrocracking unit 140 may be operated under conditions sufficient to promote or increase the reaction rate of the hydrocracking reactions to produce the hydrocracked effluent 106 having increased concentrations of smaller, lesser-boiling hydrocarbons, such as but not limited to $C_2$ to $C_{10}$ paraffins and other hydrocarbons having boiling temperatures less than or equal to 180° C. (naphtha). The resulting hydrocracked effluent 106 may have an increased concentration of hydrocarbons having boiling point temperatures less than or equal to 180° C. compared to the hydrodealkylated effluent 104. The hydrocracked effluent 106 may have a concentration of heavy polynuclear aromatic compounds less than 1000 parts per million by weight. Additionally, the hydrocracked effluent 106, as compared to the hydrodealkylated effluent 104, may have an increased fraction of naptha, kerosene, and diesel, as well as a decreased fraction having a boiling point greater than 370° C. The comparison between the hydrocracked effluent and the hydrodealkylated effluent 104 is shown in Table 1.

TABLE 1

| Fractions | Hydrocarbon Feed, wt. % | Hydrodealkylation Effluent, wt. % |
|---|---|---|
| Naptha | 0.0 | 20.8 |
| Kerosene | 0.0 | 19.2 |
| Diesel | 5.8 | 22.2 |
| 370+° C. | 94.2 | 37.8 |

Referring again to FIG. 1, a method for reducing formation of heavy polynuclear aromatic compounds during hydrocracking may include contacting a hydrodealkylation feed 102 comprising polynuclear aromatic compounds with hydrogen 103 at reaction conditions sufficient to hydrodealkylate at least a portion of the polynuclear aromatic compounds in the hydrocarbon feed 101 to produce a hydrodealkylated effluent 104. The hydrocarbon feed 101 may have any of the features, constituents, or characteristics previously discussed in the present disclosure for the hydrocarbon feed 101. The process may further include contacting the hydrodealkylated effluent 104 with hydrogen 105 in the presence of a hydrocracking catalyst, where the contacting causes at least a portion of hydrocarbons in the hydrodealkylated effluent 104 to undergo hydrocracking to produce a hydrocracked effluent 106 having a concentration of heavy polynuclear aromatic compounds less than 1,000 parts per million by weight. The hydrocracking catalyst may have any of the features, constituents, or characteristics previously discussed in the present disclosure for the hydrocracking catalyst.

Referring again to FIG. 1, a process for upgrading a hydrocarbon feed 101 may include supplying a hydrodealkylation feed 102 and hydrogen 103 to a hydrodealkylation reactor 130, the hydrocarbon feed 101 comprising polynuclear aromatic compounds. The process may further include contacting the hydrodealkylation feed 102 and the hydrogen 103 in the hydrodealkylation reactor 130, where the contacting causes at least a portion of the polynuclear aromatic compounds in the hydrocarbon feed 101 to undergo dealkylation to produce a hydrodealkylated effluent 104. The hydrodealkylation reactor 130 may have any of the features, characteristics, or operating conditions previously described in the present disclosure for the hydrodealkylation reactor 130. The process may further include passing at least a portion of the hydrodealkylated effluent 104 to a hydrocracking unit 140 downstream of the thermal hydrodealkylation unit, the hydrocracking unit 140 may include a hydrocracking catalyst. The hydrocracking unit 140 may have any of the features, characteristics, or operating conditions previously described in the present disclosure for the hydrocracking reactor, and the hydrocracking catalyst may have any of the features, constituents, or characteristics previously discussed in the present disclosure for the hydrocracking catalyst. The process may further include introducing hydrogen 105 to the hydrocracking unit 140. The process may further include contacting the portion of the hydrodealkylated effluent 104 with the hydrogen 105 in the presence of the hydrocracking catalyst in the hydrocracking unit 140, the contacting causing at least a portion of hydrocarbons in the hydrodealkylated effluent 104 to undergo hydrocracking reactions to produce a hydrocracked effluent 106 comprising a concentration of heavy polynuclear aromatic compounds less than 1000 parts per million by weight.

Still referring to FIG. 1, method for upgrading a hydrocarbon feed 101 comprises supplying a hydrodealkylation feed 102 and hydrogen 103 to a thermal hydrodealkylation unit 110, the hydrocarbon feed 101 comprising polynuclear aromatic compounds, contacting the hydrodealkylation feed 102 and the hydrogen 103 in the thermal hydrodealkylation unit 110, where the contacting causes at least a portion of the polynuclear aromatic compounds in the hydrocarbon feed 101 to undergo dealkylation to produce a hydrodealkylated effluent 104, passing at least a portion of the hydrodealkylated effluent 104 to a hydrocracking unit 140 downstream of the thermal hydrodealkylation unit 110, the hydrocracking unit 140 comprising a hydrocracking catalyst, introducing hydrogen to the hydrocracking unit, and contacting the portion of the hydrodealkylated effluent 104 with the 105 hydrogen in the presence of the hydrocracking catalyst in the hydrocracking unit 140, the contacting causing at least a portion of hydrocarbons in the hydrodealkylated effluent 104 to undergo hydrocracking reactions to produce a hydrocracked effluent 106 comprising a concentration of heavy polynuclear aromatic compounds less than 1,000 parts per million by weight. The hydrodealkylation reactor 130 may have any of the features, characteristics, or operating conditions previously described in the present disclosure for the hydrodealkylation reactor 130. The hydrocracking unit 140 may have any of the features, characteristics, or operating conditions previously described in the present disclosure for the hydrocracking reactor, and the hydrocracking catalyst may have any of the features, constituents, or characteristics previously discussed in the present disclosure for the hydrocracking catalyst.

While the present description and examples are provided in the context of whole crude oil or desalted crude oil as the hydrocarbon feed 101, it should be understood that systems and processes described in the present disclosure may be applicable for the conversion of a wide variety of heavy oils, including, but not limited to, crude oil, vacuum residue, tar sands, bitumen, atmospheric residue, vacuum gas oils, or other heavy oils.

EXAMPLES

The various embodiments of methods and systems for the processing of heavy oils will be further clarified by the following examples. The examples are illustrative in nature, and should not be understood to limit the subject matter of the present disclosure.

Example 1

In Example 1, a hydrocarbon feed was processed in a hydrodealkylation unit to reduce the formation of heavy polynuclear aromatic compounds during downstream hydrocracking. The hydrocarbon feed had the properties shown in Table 2.

TABLE 2

| Property | Unit | Value |
| --- | --- | --- |
| Density | g/mL | 0.916 |
| Sulfur | wt. % | 2.35 |
| Nitrogen | ppmw | 798 |
| MCR | wt. % | 1.00 |
| Hydrogen | wt. % | 12.35 |
| Simulated Distillation | | |
| 0 wt. % | °C. | 297 |
| 10 wt. % | °C. | 383 |
| 30 wt. % | °C. | 426 |
| 50 wt. % | °C. | 456 |
| 70 wt. % | °C. | 487 |
| 90 wt. % | °C. | 533 |
| 95 wt. % | °C. | 553 |
| 95 wt. % | °C. | 597 |

The hydrocarbon feed was processed in a hydrodealkylation reactor at 550° C., 10 MPa of hydrogen partial pressure, and a residence time of 30 seconds. The hydrogen to hydrocarbon feed ratio was 1,000 standard liters of hydrogen per liter of hydrocarbon feed. The hydrocarbon feed was processed in the hydrodealkylation unit in the absence of a hydrodealkylation catalyst.

The fractional compositions of the hydrocarbon feed and the hydrodearylation effluent are shown in Table 3.

TABLE 3

| Fractions | Hydrocarbon Feed, wt. % | Hydrodealkylation Effluent, wt. % |
| --- | --- | --- |
| Naphtha | 0.0 | 20.8 |
| Kerosene | 0.0 | 19.2 |
| Diesel | 5.8 | 22.2 |
| 370+° C. | 94.2 | 37.8 |

Figure 3:
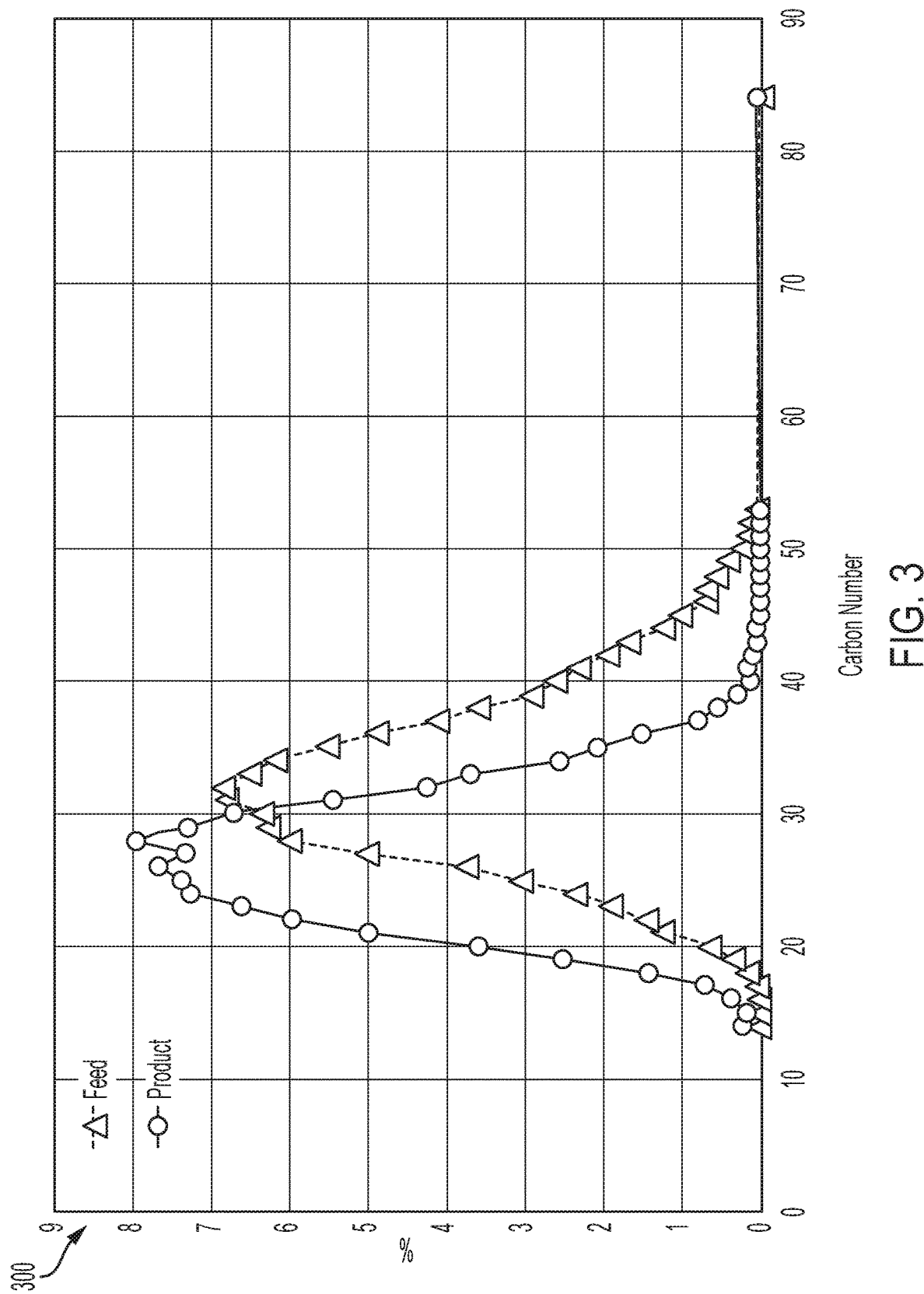
FIG. 3 graphically depicts a comparison of carbon number in the hydrocarbon feed and the hydrocracked effluent by percentage, according to one or more embodiments shown and described in this disclosure.

The hydrocarbon feed and the hydrodealkylated effluent 104 were analyzed using Fourier-transform ion cyclotron Mass Spectrometry (FT-ICR-MS). The FT-ICR-MS results, shown in FIG. 3, demonstrate a substantial reduction in the average carbon number for the hydrodealkylated effluent compared to the hydrocarbon feed. This reduction in the average carbon number of the hydrodealkylated effluent is indicative of the dealkylation of the polynuclear aromatic compounds from the hydrocarbon feed.

One or more aspects of the present disclosure are described herein. A first aspect of the present disclosure may include a method for reducing formation of heavy polynuclear aromatic compounds during hydrocracking, the method comprising: contacting a hydrocarbon feed comprising polynuclear aromatic compounds with hydrogen at reaction conditions sufficient to hydrodealkylate at least a portion of the polynuclear aromatic compounds in the hydrocarbon feed to produce a hydrodealkylated effluent; contacting at least a portion of the hydrodealkylated effluent with hydrogen in the presence of a hydrocracking catalyst, where the contacting causes at least a portion of hydrocarbons in the hydrodealkylated effluent to undergo hydrocracking to produce a hydrocracked effluent having a concentration of heavy polynuclear aromatic compounds less than 1,000 parts per million by weight.

A second aspect of the present disclosure may include the first aspect, in which the hydrocarbon feed is contacted with the hydrogen at a temperature of from 550 degrees Celsius to 800 degrees Celsius, a pressure of from 10 megapascals to 20 megapascals, and a residence time of from 0.1 seconds to 30 seconds to produce the hydrodealkylated effluent.

A third aspect of the present disclosure may include either the first or second aspects, where the hydrocarbon feed comprises one or more of vacuum gas oil, vacuum residue, de-metalized oil, de-asphalted oil, or combinations of these.

A fourth aspect of the present disclosure may include any one of the first through third aspects, where an average carbon number of the hydrodealkylated effluent is less than an average carbon number of the hydrocarbon feed. Average carbon number is determined by Fourier-Transform ion cyclotron Mass Spectrometry.

A fifth aspect of the present disclosure may include any one of the first through fourth aspects, further comprising introducing steam to the thermal hydrodealkylation unit, where the presence of steam in the hydrodealkylation unit reduces coke formation in the hydrodealkylation unit.

A sixth aspect of the present disclosure may include any one of the first through fifth aspects, further comprising introducing a disulfide oil to the thermal hydrodealkylation unit, where the presence of disulfide oil in the hydrodealkylation unit reduces coke formation in the hydrodealkylation unit.

A seventh aspect of the present disclosure may include the sixth aspect, where the disulfide oil comprises dimethyldisulfide.

An eighth aspect of the present disclosure may include any one of the first through seventh aspects, further comprising contacting the hydrocarbon feed and the hydrogen in the presence of a hydrodealkylation catalyst.

A ninth aspect of the present disclosure may include the eighth aspect, where the hydrodealkylation catalyst comprises a homogenous catalyst.

A tenth aspect of the present disclosure may include either the eighth or ninth aspects, where the hydrodealkylation catalyst comprises at least one metal selected from Groups IVB, VB, or VIB of the International Union of Pure and Applied Chemistry periodic table of the elements.

An eleventh aspect of the present disclosure may include any one of the eighth through tenth aspects, where the hydrodealkylation catalyst comprises at least one of molybdenum, tungsten, vanadium, or titanium.

A twelfth aspect of the present disclosure may include any one of the first through eleventh aspects, comprising directly passing the hydrodealkylated effluent to contact the hydrogen in the presence of the hydrocracking catalyst.

A thirteenth aspect of the present disclosure may include any one of the first through twelfth aspects, further comprising separating the hydrodealkylated effluent to produce a hydrogen effluent and a hydrocracker feed.

A fourteenth aspect of the present disclosure may include the thirteenth aspect, where the hydrogen effluent comprises at least 95 percent by weight of the hydrogen from the hydrodealkylated effluent.

A fifteenth aspect of the present disclosure may include the thirteenth aspect, where the hydrocracker feed comprises at least 90 percent by weight of the hydrocarbon compounds in the hydrodealkylated effluent.

A sixteenth aspect of the present disclosure may include the fourteenth aspect, further comprising recycling at least a portion of the hydrogen effluent back into contact with the hydrocarbon feed.

A seventeenth aspect of the present disclosure may include a method for upgrading a hydrocarbon feed, the method comprising: supplying a hydrocarbon feed and hydrogen to a thermal hydrodealkylation unit, the hydrocarbon feed comprising polynuclear aromatic compounds; contacting the hydrocarbon feed and the hydrogen in the thermal hydrodealkylation unit, where the contacting causes at least a portion of the polynuclear aromatic compounds in the hydrocarbon feed to undergo dealkylation to produce a hydrodealkylated effluent; passing at least a portion of the hydrodealkylated effluent to a hydrocracking unit downstream of the thermal hydrodealkylation unit, the hydrocracking unit comprising a hydrocracking catalyst; and contacting the portion of the hydrodealkylated effluent with the hydrogen in the presence of the hydrocracking catalyst in the hydrocracking unit, the contacting causing at least a portion of hydrocarbons in the portion of the hydrodealkylated feed to undergo hydrocracking reactions to produce a hydrocracked effluent comprising a concentration of heavy polynuclear aromatic compounds less than 1000 parts per million by weight. The method may optionally include introducing hydrogen to the hydrocracking unit. Supplemental hydrogen may be introduced to the hydrocracking unit when the amount is hydrogen passed to the hydrocracking unit as part of the hydrodealkylated effluent is not sufficient to conduct the hydroprocessing reactions.

An eighteenth aspect of the present disclosure may include the seventeenth aspect, where the hydrocarbon feed comprises one or more of vacuum gas oil, vacuum residue, de-metalized oil, de-asphalted oil, or combinations of these.

A nineteenth aspect of the present disclosure may include either the seventeenth or eighteenth aspects, where an average carbon number of the hydrodealkylated effluent is less than an average carbon number of the hydrocarbon feed before hydrodealkylation. Average carbon number is determined by Fourier-Transform ion cyclotron Mass Spectrometry.

A twentieth aspect of the present disclosure may include any one of the seventeenth through nineteenth aspects, comprising contacting the hydrocarbon feed with the hydrogen in the thermal hydrodealkylation unit at a temperature of from 550° C. to 800° C.

A twenty-first aspect of the present disclosure may include any one of the seventeenth through twentieth aspects, comprising contacting the hydrocarbon feed with the hydrogen in the thermal hydrodealkylation unit at a temperature of from 650° C. to 700° C.

A twenty-second aspect of the present disclosure may include any one of the seventeenth through twenty-first aspects, comprising contacting the hydrocarbon feed with the hydrogen in the thermal hydrodealkylation unit at a pressure of from 10 megapascal to 20 megapascal.

A twenty-third aspect of the present disclosure may include any one of the seventeenth through twenty-second aspects, comprising contacting the hydrocarbon feed with the hydrogen in the thermal hydrodealkylation unit at a residence time of from 0.1 seconds to 30 seconds.

A twenty-fourth aspect of the present disclosure may include any one of the seventeenth through twenty-third aspects, comprising supplying the hydrogen to the thermal hydrodealkylation unit at a feed rate less than or equal to 2500 standard liters per liter of hydrocarbon feed.

A twenty-fifth aspect of the present disclosure may include any one of the seventeenth through twenty-fourth aspects, further comprising introducing steam to the thermal hydrodealkylation unit where the presence of steam in the hydrodealkylation unit reduces coke formation in the hydrodealkylation unit, where the presence of steam in the hydrodealkylation unit reduces to minimize coke formation in the hydrodealkylation unit.

A twenty-sixth aspect of the present disclosure may include any one of the seventeenth through twenty-fifth aspects, further comprising introducing a disulfide oil to the thermal hydrodealkylation unit where the presence of disulfide oil in the hydrodealkylation unit reduces coke formation in the hydrodealkylation unit, where the presence of disulfide oil in the hydrodealkylation unit reduces coke formation in the hydrodealkylation unit.

A twenty-seventh aspect of the present disclosure includes the twenty-sixth aspect, where the disulfide oil comprises dimethyldisulfide.

A twenty-eighth aspect of the present disclosure may include any one of the seventeenth through twenty-seventh aspects, where the thermal hydrodealkylation unit does not include a solid hydrodealkylation catalyst.

A twenty-ninth aspect of the present disclosure may include any one of the seventeenth through twenty-eighth aspects, where the thermal hydrodealkylation unit comprises a hydrodealkylation catalyst and the method comprises contacting the hydrocarbon feed with the hydrogen in the presence of the hydrodealkylation catalyst.

A thirtieth aspect of the present disclosure may include the twenty-ninth aspect, where the hydrodealkylation catalyst comprises a homogenous catalyst.

A thirty-first aspect of the present disclosure may include either the twenty-ninth or thirtieth aspects, where the hydrodealkylation catalyst comprises at least one metal selected from Groups IVB, VB, or VIB of the International Union of Pure and Applied Chemistry periodic table of the elements.

A thirty-second aspect of the present disclosure may include the thirty-first aspect, where the hydrodealkylation catalyst comprises at least one of molybdenum, tungsten, vanadium, or titanium.

A thirty-third aspect of the present disclosure may include any one of the seventeenth through thirty-second aspects, comprising passing the hydrodealkylated effluent directly from the thermal hydrodealkylation unit to the hydrocracking unit.

A thirty-fourth aspect of the present disclosure may include any one of the seventeenth through thirty-third aspects, further comprising: separating the hydrodealkylated effluent in a separation unit downstream of the thermal hydrodealkylation unit to produce a hydrogen effluent and a hydrocracking feed; and passing the hydrocracking feed to the hydrocracking unit.

A thirty-fifth aspect of the present disclosure may include the thirty-fourth aspect, where the hydrogen effluent comprises at least 95 percent by weight of the hydrogen from the hydrodealkylated effluent.

A thirty-sixth aspect of the present disclosure may include either the thirty-fourth or thirty-fifth aspects, where the hydrocracking feed comprises at least 90 percent by weight of the hydrocarbon compounds from the hydrodealkylated effluent.

A thirty-seventh aspect of the present disclosure may include any one of the thirty-fourth through thirty-sixth aspects, comprising: passing the hydrodealkylated effluent directly from the thermal hydrodealkylation unit to the separation unit; and passing the hydrocracking feed directly from the separation unit to the hydrocracking unit.

A thirty-eighth aspect of the present disclosure may include any one of the thirty-fourth through thirty-seventh aspects, further comprising recycling at least a portion of the hydrogen effluent back to the thermal hydrodealkylation unit.

A thirty-ninth aspect of the present disclosure may include a system for upgrading a hydrocarbon feed, the system comprising: a thermal hydrodealkylation unit operable to contact a hydrocarbon feed comprising polynuclear aromatic compounds with hydrogen to produce a hydrodealkylated effluent; and a hydrocracking unit downstream of the thermal hydrodealkylation unit, the hydrocracking unit comprising a hydrocracking catalyst and operable to contact at least a portion of the hydrodealkylated effluent with hydrogen in the presence of the hydrocracking catalyst to produce a hydrocracked effluent having a concentration of heavy polynuclear aromatic compounds less than 1,000 parts per million by weight.

A fortieth aspect of the present disclosure may include the thirty-ninth aspect, where the thermal hydrodealkylation unit comprises a furnace and a hydrodealkylation reactor downstream of the furnace, where the furnace is operable to preheat the hydrocarbon feed to a reaction temperature of between 550 degrees Celsius and 800 degrees Celsius and the hydrodealkylation reactor is operable to contact the hydrocarbon feed with the hydrogen to produce the hydrodealkylated effluent.

A forty-first aspect of the present disclosure may include either the thirty-ninth or fortieth aspects, where the hydrocracking unit is directly downstream of the thermal hydrodealkylation unit.

A forty-second aspect of the present disclosure may include any one of the thirty-ninth through forty-first aspects, further comprising a separation unit downstream of the hydrodealkylation section, where the separation unit is operable to separate the hydrodealkylated effluent into at least a hydrocracking feed and a hydrogen effluent.

A forty-third aspect of the present disclosure may include the forty-second aspect, where the separation unit is disposed directly downstream of a hydrodealkylation reactor of the thermal hydrodealkylation unit.

A forty-fourth aspect of the present disclosure may include either the forty-second or forty-third aspects, further comprising a hydrogen recycle operable to pass at least a portion of the hydrogen effluent from the separation unit back to the thermal hydrodealkylation unit.

A forty-fifth aspect of the present disclosure may include any one of the thirty-ninth through forty-fourth aspects, where the thermal hydrodealkylation unit further comprises a hydrodealkylation catalyst.

A forty-sixth aspect of the present disclosure may include the forty-fifth aspect, where the hydrodealkylation catalyst comprises a homogenous catalyst.

A forty-seventh aspect of the present disclosure may include either the forty-fifth or forty-sixth aspects, where the hydrodealkylation catalyst comprises at least one metal selected from Groups IVB, VB, or VIB of the International Union of Pure and Applied Chemistry periodic table of the elements.

A forty-eighth aspect of the present disclosure may include the forty-seventh aspect, where the hydrodealkylation catalyst comprises at least one of molybdenum, tungsten, vanadium, or titanium.

A forty-ninth aspect of the present disclosure may include any one of the thirty-ninth through forty-eighth aspects, where the thermal hydrodealkylation unit is operable to contact the hydrocarbon feed with the hydrogen at a temperature of from 550° C. to 800° C., a pressure of from 10 megapascals to 20 megapascals, and a residence time of from 0.1 seconds to 30 seconds to produce the hydrodealkylated effluent.

It is noted that one or more of the following claims utilize the term "where" and "in which" as transitional phrases. For the purposes of defining the present technology, it is noted that these terms are introduced in the claims as open-ended transitional phrases that are used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

What is claimed is:

1. A method for reducing formation of heavy polynuclear aromatic compounds during hydrocracking, the method comprising:
   contacting a hydrocarbon feed comprising polynuclear aromatic compounds with hydrogen at reaction conditions sufficient to hydrodealkylate at least a portion of the polynuclear aromatic compounds in the hydrocarbon feed to produce a hydrodealkylated effluent;
   contacting at least a portion of the hydrodealkylated effluent with hydrogen in the presence of a hydrocracking catalyst, where the contacting causes at least a portion of hydrocarbons in the hydrodealkylated effluent to undergo hydrocracking to produce a hydrocracked effluent having a concentration of heavy polynuclear aromatic compounds less than 1,000 parts per million by weight.

2. The method of claim 1, in which the hydrocarbon feed is contacted with the hydrogen at a temperature of from 550 degrees Celsius to 800 degrees Celsius, a pressure of from 10 megapascals to 20 megapascals, and a residence time of from 0.1 seconds to 30 seconds to produce the hydrodealkylated effluent.

3. The method of claim 1, where the hydrocarbon feed comprises one or more of vacuum gas oil, vacuum residue, de-metalized oil, de-asphalted oil, or combinations of these.

4. The method of claim 1, where an average carbon number of the hydrodealkylated effluent is less than an average carbon number of the hydrocarbon feed.

5. The method of claim 1, further comprising introducing steam, a disulfide oil, or both, to the thermal hydrodealkylation unit, where the presence of steam, disulfide oil, or both, in the hydrodealkylation unit reduces coke formation in the hydrodealkylation unit.

6. The method of claim 1, comprising directly passing the hydrodealkylated effluent to contact the hydrogen in the presence of the hydrocracking catalyst.

7. The method of claim 1, further comprising separating the hydrodealkylated effluent to produce a hydrogen effluent and a hydrocracker feed.

8. The method of claim 7, further comprising recycling at least a portion of the hydrogen effluent back into contact with the hydrocarbon feed.

9. A method for upgrading a hydrocarbon feed, the method comprising:
   supplying a hydrocarbon feed and hydrogen to a thermal hydrodealkylation unit, the hydrocarbon feed comprising polynuclear aromatic compounds;
   contacting the hydrocarbon feed and the hydrogen in the thermal hydrodealkylation unit, where the contacting causes at least a portion of the polynuclear aromatic compounds in the hydrocarbon feed to undergo dealkylation to produce a hydrodealkylated effluent;
   passing at least a portion of the hydrodealkylated effluent to a hydrocracking unit downstream of the thermal hydrodealkylation unit, the hydrocracking unit comprising a hydrocracking catalyst; and
   contacting the portion of the hydrodealkylated effluent with hydrogen in the presence of the hydrocracking catalyst in the hydrocracking unit, the contacting causing at least a portion of hydrocarbons in the portion of the hydrodealkylated feed to undergo hydrocracking reactions to produce a hydrocracked effluent comprising a concentration of heavy polynuclear aromatic compounds less than 1000 parts per million by weight.

10. The method of claim 9, where the hydrocarbon feed comprises one or more of vacuum gas oil, vacuum residue, de-metalized oil, de-asphalted oil, or combinations of these.

11. The method of claim 9, comprising contacting the hydrocarbon feed with the hydrogen in the thermal hydrodealkylation unit at a temperature of from 550° C. to 800° C., a pressure of from 10 megapascal to 20 megapascal, and for a residence time of from 0.1 seconds to 30 seconds.

12. The method of claim 9, comprising supplying the hydrogen to the thermal hydrodealkylation unit at a feed rate less than or equal to 2500 standard liters per liter of hydrocarbon feed.

13. The method of claim 9, comprising passing the hydrodealkylated effluent directly from the thermal hydrodealkylation unit to the hydrocracking unit.

14. The method of claim 9, further comprising:
   separating the hydrodealkylated effluent in a separation unit downstream of the thermal hydrodealkylation unit to produce a hydrogen effluent and a hydrocracking feed; and
   passing the hydrocracking feed to the hydrocracking unit.

15. A system for upgrading a hydrocarbon feed, the system comprising:
- the hydrocarbon feed comprising polynuclear aromatic compounds;
- a hydrogen stream;
- a thermal hydrodealkylation unit fluidly coupled to the hydrocarbon feed and the hydrogen feed and operable to contact the hydrocarbon feed comprising the polynuclear aromatic compounds with hydrogen from the hydrogen stream to produce a hydrodealkylated effluent;
- a hydrocracking unit downstream of the thermal hydrodealkylation unit and in fluid communication with the hydrogen stream, the hydrocracking unit comprising a hydrocracking catalyst disposed within the hydrocracking unit and operable to contact at least a portion of the hydrodealkylated effluent with hydrogen from the hydrogen stream in the presence of the hydrocracking catalyst to produce a hydrocracked effluent; and
- an outlet of the hydrocracking unit, where the outlet is operable to pass the hydrocracked effluent out of the hydrocracking unit and the hydrocracked effluent has a concentration of heavy polynuclear aromatic compounds less than 1,000 parts per million by weight.

16. The system of claim 15, where the thermal hydrodealkylation unit comprises a furnace and a hydrodealkylation reactor downstream of the furnace, where the furnace is operable to preheat the hydrocarbon feed to a reaction temperature of between 550 degrees Celsius and 800 degrees Celsius and the hydrodealkylation reactor is operable to contact the hydrocarbon feed with the hydrogen to produce the hydrodealkylated effluent.

17. The system of claim 15, where the hydrocracking unit is directly downstream of the thermal hydrodealkylation unit.

18. The system of claim 15, further comprising a separation unit downstream of the hydrodealkylation unit and upstream of the hydrocracking unit, where the separation unit is operable to separate the hydrodealkylated effluent into at least a hydrocracking feed and a hydrogen effluent.

19. The system of claim 15, further comprising a hydrogen recycle operable to pass at least a portion of the hydrogen effluent from the separation unit back to the thermal hydrodealkylation unit.

20. The system of claim 15, where the thermal hydrodealkylation unit is operable to contact the hydrocarbon feed with the hydrogen at a temperature of from 550° C. to 800° C., a pressure of from 10 megapascals to 20 megapascals, and a residence time of from 0.1 seconds to 30 seconds to produce the hydrodealkylated effluent.

\* \* \* \* \*